(No Model.)
J. P. PUTNAM.
WATER TRAP.
No. 311,146.  Patented Jan. 20, 1885.
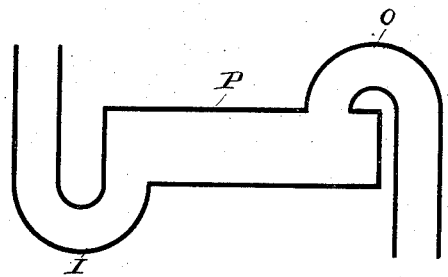
Attests:
John G. Hinkel Jr.
Charles E. Foster
J. P. Putnam
Inventor: by
J. L. Freeman
atty

UNITED STATES PATENT OFFICE.

J. PICKERING PUTNAM, OF BOSTON, MASSACHUSETTS.

WATER-TRAP.

SPECIFICATION forming part of Letters Patent No. 311,146, dated January 20, 1885.

Application filed November 2, 1883. (No model.)

*To all whom it may concern:*

Be it known that I, JOHN PICKERING PUTNAM, of Boston, in the State of Massachusetts, have invented a new and useful Improvement in Water-Traps, of which the following is a full, clear, and exact description, when taken in connection with the accompanying drawing.

The object of the invention is to provide the trap with a water seal which will resist suction or siphonage, and at the same time permit the trap to be self-scouring; and the invention consists in placing between the lower or inlet bend and the upper or outlet bend of the trap a long, narrow, and low chamber adapted permanently to hold a thin sheet of water covering superficially a large area as compared with a cross-section of the inlet to the chamber from the lower bend, the passage containing the lower bend entering said chamber at the bottom, and the passage containing the upper bend leaving said chamber at the top. It is essential that the chamber be low and narrow—that is, that throughout the chamber a cross-section of it at right angles shall not greatly exceed in measurement the measurement of a cross-section of the inlet-passage at or near the entrance of the latter, in order that the chamber may be self-scouring; and it is essential for this purpose that the chamber, being for this purpose small in vertical cross-section, shall be of very considerable length, measured horizontally, in order that, while there shall always remain in the trap a quantity of water considerably larger than the quantity required to fill the lower or inlet bend of the trap, this body of water shall be in vertical measurement thin or shallow, with an air-space above it sufficient to allow a column of water or air or of water and air suddenly entering the chamber from the lower bend to pass readily through the thin sheet of water in a vertical direction, and, with scarcely any disturbance to such sheet of water, find an easy passage along the air-space above such sheet of water.

In operation, when the water fills the inlet-bend of the trap and lies in a thin and extended sheet in the bottom of the chamber, covering the entrance therein from the lower or inlet bend, and there takes place a rapid flowing of water through the main discharge or soil pipe, with which the trap communicates, the air in the chamber above the thin sheet of water will be sucked out, and to fill the partial vacuum thereby caused the water in the lower bend or dip and air behind will be drawn into the chamber. The water thus entering with great force will easily pass through the thin sheet of water, and then be broken up as it is thrown or deflected from wall to wall in the chamber, while the air following or even entering with it will be drawn into the upper bend or overflow, and, finally, when the siphonage ceases, it will be found that the siphonage has been fed by air alone.

In the normal condition of the trap, before the first suction or siphonage takes place, the exact condition which is supposed above does not exist—that is, there is no thin sheet of water until after one action of siphonage, for the interposed chamber will at first be full of water, the level being determined by the overflow; but if the chamber be constructed as hereinafter directed, so that the distance which the water and air entering the chamber from the lower bend must travel horizontally before passing out of the chamber sufficiently exceeds the distance which they must travel vertically within the chamber, and the chamber be so shaped that water entering it with force will be deflected more or less before it can travel the said superior horizontal distance, then in operation it will be found that the first siphonage which takes place will only cause the water entering the chamber to fall to the level or shallow depth above supposed, and thereafter the said condition will exist, and the subsequent operations occasioned by siphonage will be like the operation first described. The intervening chamber should be large enough to receive and hold the water normally in the lower bend, in addition to the shallow body of water which covers its bottom, including the entrance of the inlet from the lower bend, and yet leave an air-space above the water sufficient to allow a free passage of air from end to end.

In the drawing the invention is sufficiently represented by a diagram, in which I is the part or passage containing the dip, and O the part or passage containing the overflow, P being the above-described intermediate chamber, either rectilinear or round in vertical cross-section, as the case may be, for in practice the intermediate chamber may be a long piece of pipe inserted horizontally between two pipes, bent to form, respectively, the dip and overflow, the diameter of the inserted pipe or chamber being a little greater, and only a little greater, as above set forth, than the diameter of the pipe containing the dip at its entrance to the chamber.

Further description of the mode of operation is unnecessary.

I claim—

A trap having between the dip and overflow thereof a chamber long in horizontal measurement, but in cross-section only a little exceeding in measurement the measurement of a cross-section of the part or passage containing the dip at or near its entrance to said chamber, the dip and overflow communicating with the said chamber at positions remote from each other, the former at the bottom and the latter at the top, substantially as described.

J. PICKERING PUTNAM.

Witnesses:
L. J. ROBINSON,
WM. S. ROGERS.